United States Patent [19]

Sato

[11] Patent Number: 5,305,046
[45] Date of Patent: Apr. 19, 1994

[54] MULTI-POINT DISTANCE MEASUREMENT APPARATUS

[75] Inventor: Shigemasa Sato, Chiba, Japan

[73] Assignee: Nikon Corporation, Tokyo, Japan

[21] Appl. No.: 774,193

[22] Filed: Oct. 10, 1991

[30] Foreign Application Priority Data

Oct. 15, 1990 [JP] Japan .................. 2-275716

[51] Int. Cl.$^5$ ............................... G03B 13/36
[52] U.S. Cl. ..................... 354/402; 354/403; 354/406
[58] Field of Search .............. 354/400, 402, 403, 406, 354/407, 408

[56] References Cited

U.S. PATENT DOCUMENTS

| 4,908,646 | 3/1990 | Sato et al. | 354/402 |
| 4,943,824 | 7/1990 | Nabeshima et al. | 354/403 |
| 5,006,700 | 4/1991 | Kosaka et al. | 354/403 |
| 5,051,766 | 9/1991 | Nonaka et al. | 354/402 |
| 5,091,742 | 2/1992 | Fukahori et al. | 354/402 |
| 5,151,583 | 9/1992 | Tokunaga et al. | 354/406 |

Primary Examiner—Russell E. Adams
Attorney, Agent, or Firm—Shapiro and Shapiro

[57] ABSTRACT

A multi-point distance measurement apparatus comprises a distance measurement device for, and measuring distances to first and second points of an object field to produce distance information, a device for determining a difference between the distances to the first point and the second point in accordance with the distance information from the distance measurement device, and a photographing distance selection device for comparing the difference with a predetermined value and selecting the smaller one of the distances as a photographing distance when the difference is larger than the predetermined value and selecting the distance to the first point as the photographing distance when the difference is not greater than the predetermined value.

16 Claims, 6 Drawing Sheets

MULTI-POINT DISTANCE MEASUREMENT APPARATUS

BACKGROUND OF THE INVENTION

1. Field of the Invention

The present invention relates to a multi-point distance measurement apparatus which determines a photographing distance by a plurality of distance information.

2. Related Background Art

In the past, it has been a common practice in a multi-point distance measurement apparatus to measure distances for a plurality of points and to focus a lens to a photographing distance to include an object within the depth of field.

However, in the prior art multi-point distance measurement apparatus, the lens is not always best focused to a principal object.

Figure 5:
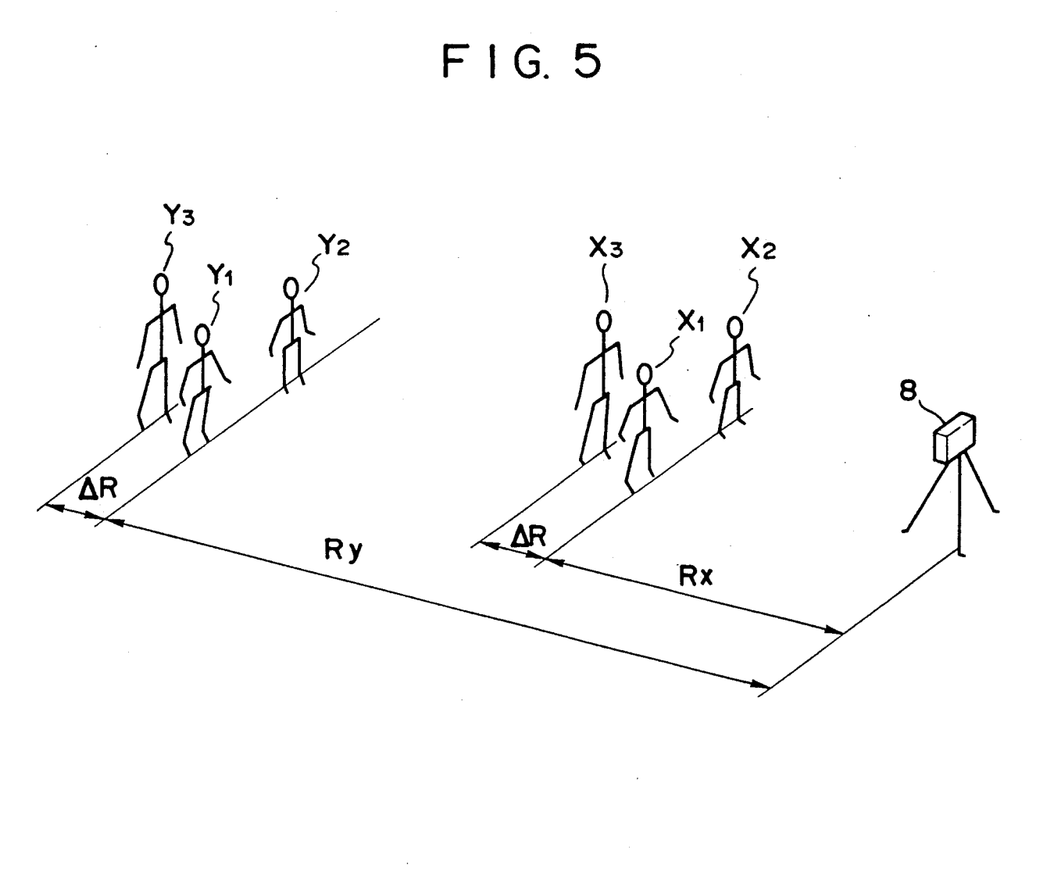
FIG. 5 shows a perspective view of a photographing scene.

FIG. 5 shows a perspective view including two photographing scenes, a near scene and a far scene. In the near scene, two persons $X_1$ and $X_2$ stand beside each other at a position of a near photographing distance Rx from a camera 8, and one person $X_3$ stands between the two persons $X_1$ and $X_2$ at a distance $\Delta R$ behind them. In the far scene, persons $Y_1$, $Y_2$, and $Y_3$ stand with the same positional relationship as persons $X_1$-$X_3$, but with persons $Y_1$ and $Y_2$ at a far photographing distance Ry from the camera.

The near scene is typical for photography in a relatively small area, such as indoors, and the far scene is typical for photography in a relatively large area, such as outdoors.

Figure 6:
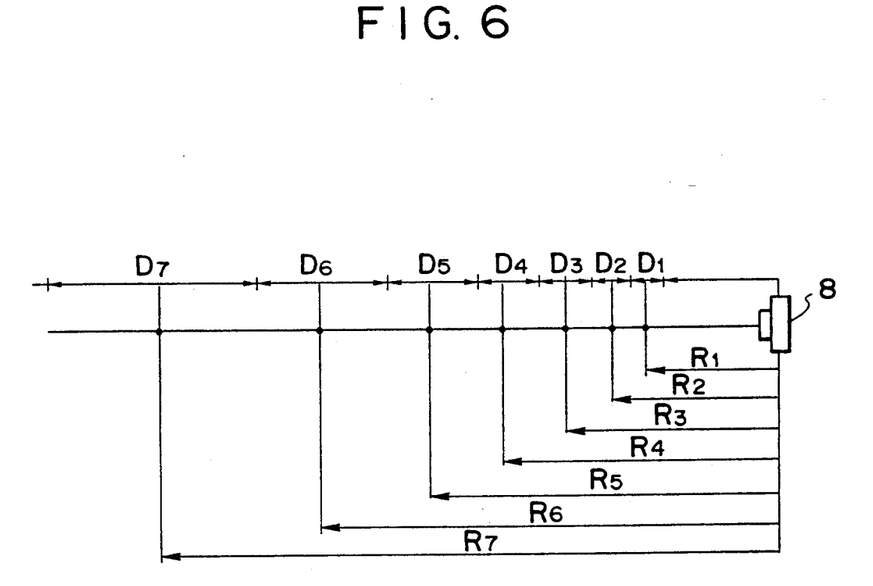
FIG. 6 shows a relationship between a photographing distance and an object view field depth.

FIG. 6 shows the relationship between depth of field and photographing distance. As shown in FIG. 6, as the photographing distance $R_m$ increases, the corresponding depth of field $D_m$ increases. Conversely, as the photographing distance decreases, the depth of field decreases. With respect to the scene in FIG. 5, it will thus be appreciated that whether the distance $\Delta R$ is within the depth of field will depend on the applicable photographing distance. Consequently, when the photographer's intended principal object is the center person, whether or not the center person is within the depth of field will depend on whether the photographing is near distance photographing or far distance photographing. This presents a problem in that the photographer may or may not obtain a properly focused photograph of the intended principal object.

Further, in photographing a far scene in a flash mode, even if the photographing distance is set to a principal object, there is a potential problem in that the flash light may not reach the principal object so that a proper exposure is not obtained.

SUMMARY OF THE INVENTION

It is a general object of the present invention to overcome the above-noted problems of the prior art.

It is a more particular object of the invention to provide a multi-point distance measurement apparatus which sets a distance to a given object to be focused as a photographing distance, regardless of whether the photographing is near scene or far scene photographing.

It is another object of the present invention to provide a multi-point distance measurement apparatus which permits photographing with a proper exposure in a flash photographing mode, especially of a far scene.

As will be more fully explained hereinafter, the present invention sets a photographing distance based on a comparison of a difference between the distances to two points of an object field (preferably corresponding to a center point and a side point of an image field) and one or more predetermined values. The predetermined value or values may be determined experimentally. For example, in the case of a near scene as shown in FIG. 5, the rear person $X_3$ is usually background when the distance $\Delta R$ is more than 30-50 cm. That is, it is not necessary to focus the lens to the rear object. In the case of a far scene as shown in FIG. 5, the rear object is usually background if the distance $\Delta R$ is greater than approximately 1 m.

Thus, in accordance with a first aspect of the invention, a multi-point distance measurement apparatus may comprise distance measurement means for measuring distances to first and second points of an object field to produce distance information; difference determining means for determining a difference between the distances to the first point and the second point based on the distance information from the distance measurement means; and photographing distance when the difference is larger than the predetermined value and selecting the distance to the first point as the photographing distance when the difference is smaller than the predetermined value.

According to a second aspect of the invention, a multi-point distance measurement apparatus may comprise distance measurement means for measuring distances to first and second points of an object field to produce distance information; distance mode determination means for determining whether a photographing mode is a far distance photographing mode in which a distance to the object is long or a near distance photographing mode in which the distance to the object is short, based on the distance information produced by the distance measurement means; difference determining means for determining a difference between the distances to the first and second points based on the distance information produced by the distance measurement means; and photographing distance selection means for selecting a photographing distance.

The photographing distance selection means operates in a case when the distance mode determination means determines the near distance photographing mode to compare the aforesaid difference with a first predetermined value, to select a smaller one of the distances to the first and second points as the photographing distance when the difference is larger than the first predetermined value, and to select the distance to the first point as the photographing distance when the difference is smaller than the first predetermined value.

In a case when the distance mode determination means determines the far distance photographing mode, the photographing distance selection means operates to compare the aforesaid difference with a second predetermined value, to select a smaller one of the distances to the first and second points as the photographing distance when the difference is larger than the second predetermined value, and to select the distance to the first point as the photographing distance when the difference is smaller than the second predetermined value.

According to still another aspect of the invention, a multi-point distance measurement apparatus may comprise distance measurement means for measuring distances to first and second points of an object field to produce distance information; distance mode determination means for determining whether a photographing mode is a far distance photographing mode in which a distance to the object is long or a near distance photographing mode in which the distance to the object is short, based on the distance information produced by the distance measurement means; flash photographing mode determination means for determining a flash photographing mode or non-flash photographing mode; difference determining means for determining a difference between the distances to the first and second points based on the distance information produced by the distance measurement means; flash reach determining means for determining whether a nearer of the first and second points is within a flash reach distance when both the far distance and flash photographing modes are determined; and photographing distance selecting means for selecting photographing distance.

The photographing distance selection means operates in a case when the determination means determines the near distance photographing mode to compare the aforesaid difference with a first predetermined value, to select a smaller one of the distances to the first and second points as a photographing distance when the difference is larger than the first predetermined value, and to select the distance to the first point as the photographing distance when the difference is smaller than the first predetermined value.

In a case when the distance mode determination means determines the far distance photographing mode and the flash photographing mode determination means determines the non-flash photographing mode, the photographing distance selection means operates to compare the aforesaid difference with a second predetermined value, to select a smaller one of the distances to the first and second points as the photographing distance when the difference is larger than the second predetermined value, and to select the distance to the first point as the photographing distance when the difference is smaller than the second predetermined value.

In a case when the distance mode determination means determines the far distance photographing mode, the flash photographing mode determination means determines the flash photographing mode, and the flash reach determining means determines that the nearer point is within the flash reach distance, the photographing distance selection means operates to compare the aforesaid difference with the second predetermined value, to select the smaller one of the distances to the first and second points as the photographing distance when the difference is larger than the second predetermined value, and to select the distance to the first point as the photographing distance when the difference is smaller than the second predetermined value.

In a case when the distance mode determination means determines the far distance photographing mode, the flash photographing mode determination means determines the flash photographing mode, and the flash reach determining means determines that the nearer point is not within the flash reach distance, the photographing distance selection means operates to select the distance to the nearer point as the photographing distance.

As will be appreciated hereinafter, the use of multiple predetermined values in accordance with the second and third aspects of the invention allows for more flexible handling of near scene and far scene photography. Also, by taking flash reach distance into account according to the third aspect of the invention, although it may not be possible to properly photograph the intended scene, the photographer will at least obtain a more natural photograph.

BRIEF DESCRIPTION OF THE DRAWINGS

FIGS. 1 to 3 show a first embodiment of a multi-point distance measurement apparatus of the present invention, in which

DETAILED DESCRIPTION OF THE PREFERRED EMBODIMENTS

One embodiment of the present invention is now explained with reference to FIGS. 1–3 of the drawings.

Figure 1:
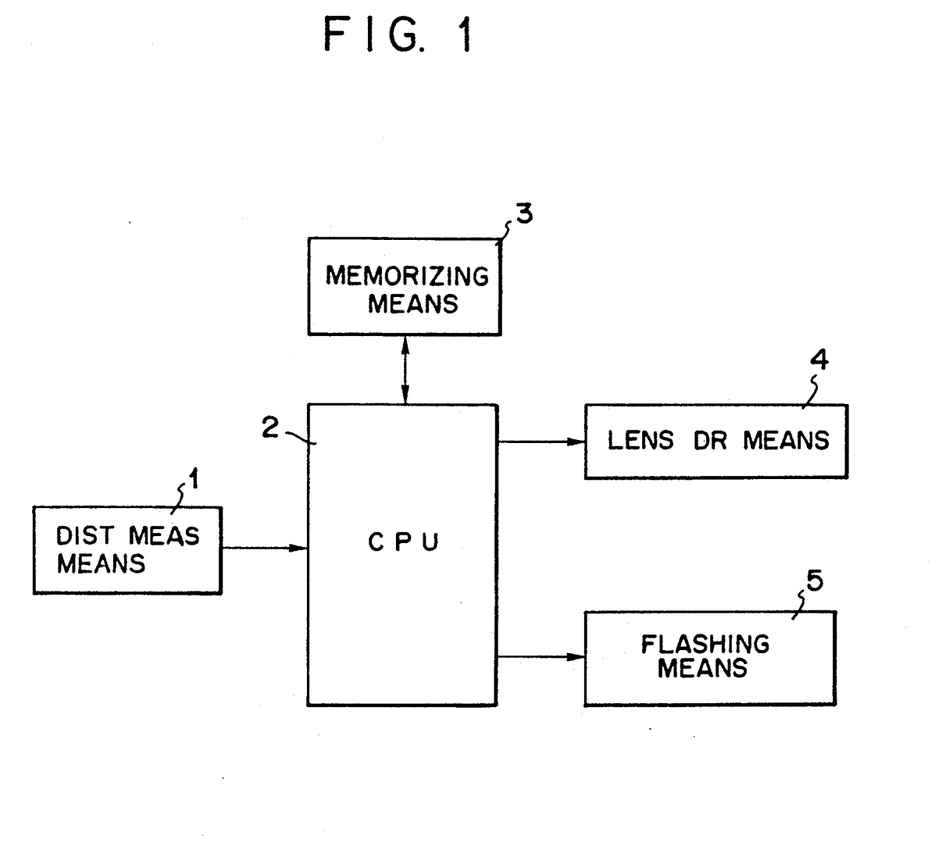
FIG. 1 shows a block diagram.

The multi-point distance measurement apparatus of the present embodiment comprises, as shown in FIG. 1, distance measurement means 1, a CPU 2, memory means 3, lens drive means 4 and flashing means 5.

Figures 2A, 2B:
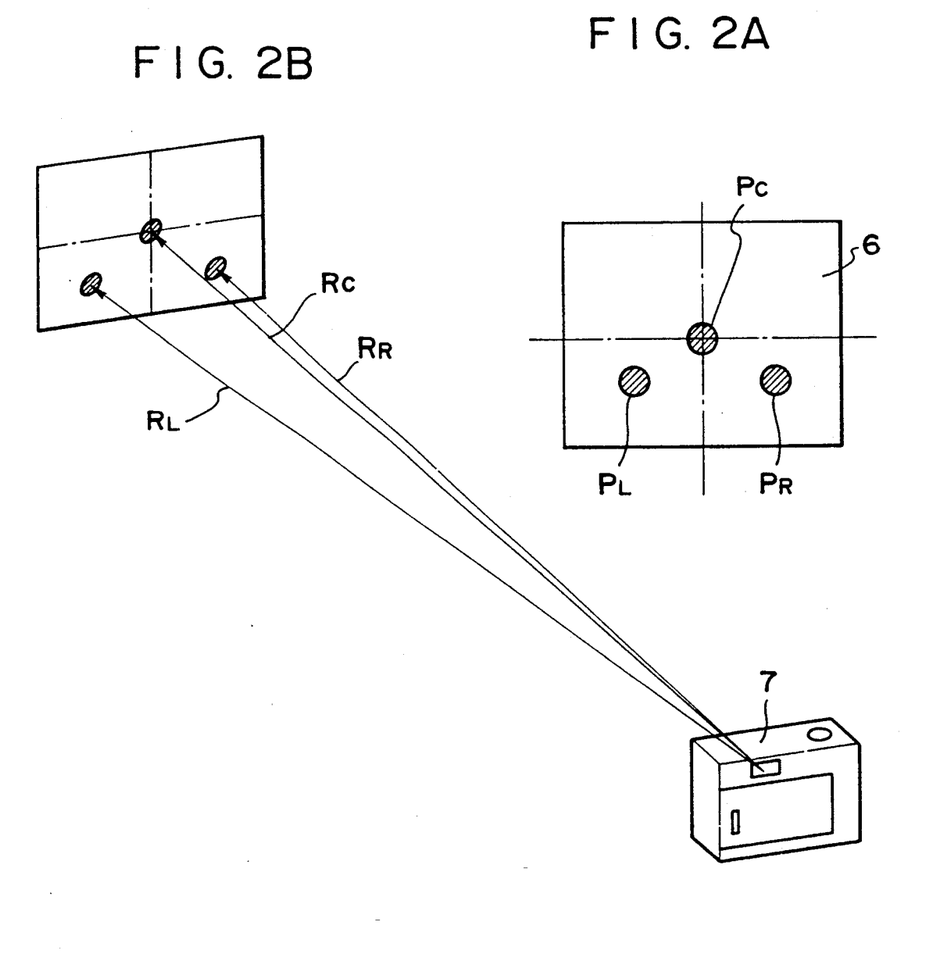
FIGS. 2A and 2B show distance measurement means and FIG. 3 shows a flow chart of an operation.
Figure 3:
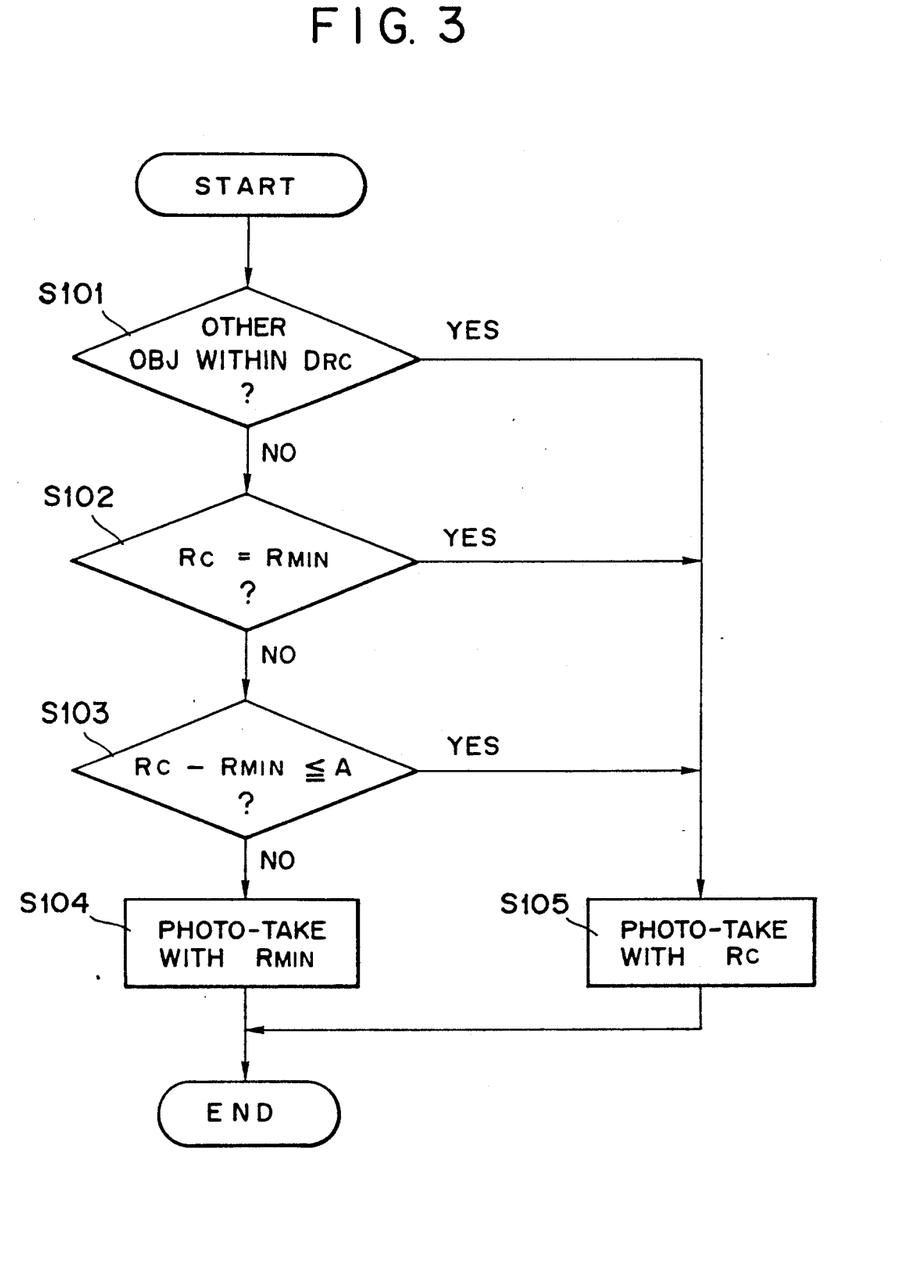

The distance measurement means 1 has distance measurement points at three points, a center $P_C$, lower left $P_L$ and lower right $P_R$, as seen on a photographing image plane 6 as shown in FIG. 2A. A camera 7 to which the present multi-point distance measurement apparatus is applied measures photographing distances $R_C$, $R_L$ and $R_A$ to objects at the distance measurement points $P_C$, $P_L$ and $O_R$ as shown in FIG. 2B.

An output of the distance measurement means 1 is temporarily stored in the memory means 3 through the CPU 2.

The CPU 2 calculates differences between the distance to the center point $P_C$ and the distances to the other points $P_L$ and $P_R$ based on the distance information stored in the memory means 3 and utilizes the results in determining an optimum photographing distance as will be explained.

An output of the CPU 2 is supplied to the lens drive means 4 and the flashing means 5. The lens drive means 4 drives a focusing lens (not shown) in accordance with the photographing distance determined by the CPU 2. The flashing means is light emission means for flash photographing.

An operation of the first embodiment is now explained with reference to a flow chart of FIG. 3.

In a step S101, the object distances $R_C$ (an object distance at the center of the image plane), $R_L$ (an object distance on the left of the image plane) and $R_R$ (an object distance on the right of the image plane) measured at the three distance measurement points $P_C$, $P_L$ and $P_R$ are compared to determine whether objects at the object distances $R_L$ and $R_R$ are within the depth of field $D_{RC}$ for the object distance $R_C$ of the center point. If the objects at the object distances $R_L$ and $R_R$ are within the depth of field $D_{RC}$ for the object distance $R_C$ of the center point, the object distance $R_C$ of the center point is selected as the photographing distance (step S105), and otherwise the process proceeds to a step S102.

In the step S102, whether the object distance $R_C$ of the center point is equal to an object distance $R_{MIN}$ of the nearest object or not is determined, and if it is equal ($R_C = R_{MIN}$), the object distance $R_C$ at the center point is selected as the photographing distance (step S105), and otherwise the process proceeds to a step S103.

In the step S103, a difference $\Delta R$ ($= R_C - R_{MIN}$) between the object distance $R_C$ at the center point and the object distance $R_{MIN}$ of the nearest object is calculated and the difference $\Delta R$ is compared with a reference distance A (for example 1 m).

If the difference $\Delta R$ is equal to or smaller than the reference distance A ($\Delta R \leq A$), the object distance $R_C$ at the center point is selected as the photographing distance, and otherwise the object distance $R_{MIN}$ of the nearest object ($R_L$ or $R_R$) is selected as the photographing distance (step S104).

In the first embodiment, when it is to be determined whether a front object or a rear object is to be selected as a principal object in a photographing scene as shown in FIG. 5, the object at the center of the image plane is selected as the principal object if the difference between the distance thereto and the distance to the front (nearest) object is equal to or smaller than the reference distance A, which is experimentally determined. When the difference is larger, the front object is selected as the principal object.

Accordingly, for the same scene, the distance to a given object to be focused can be selected as the photographing distance, regardless of its actual measured distance.

Figure 4:
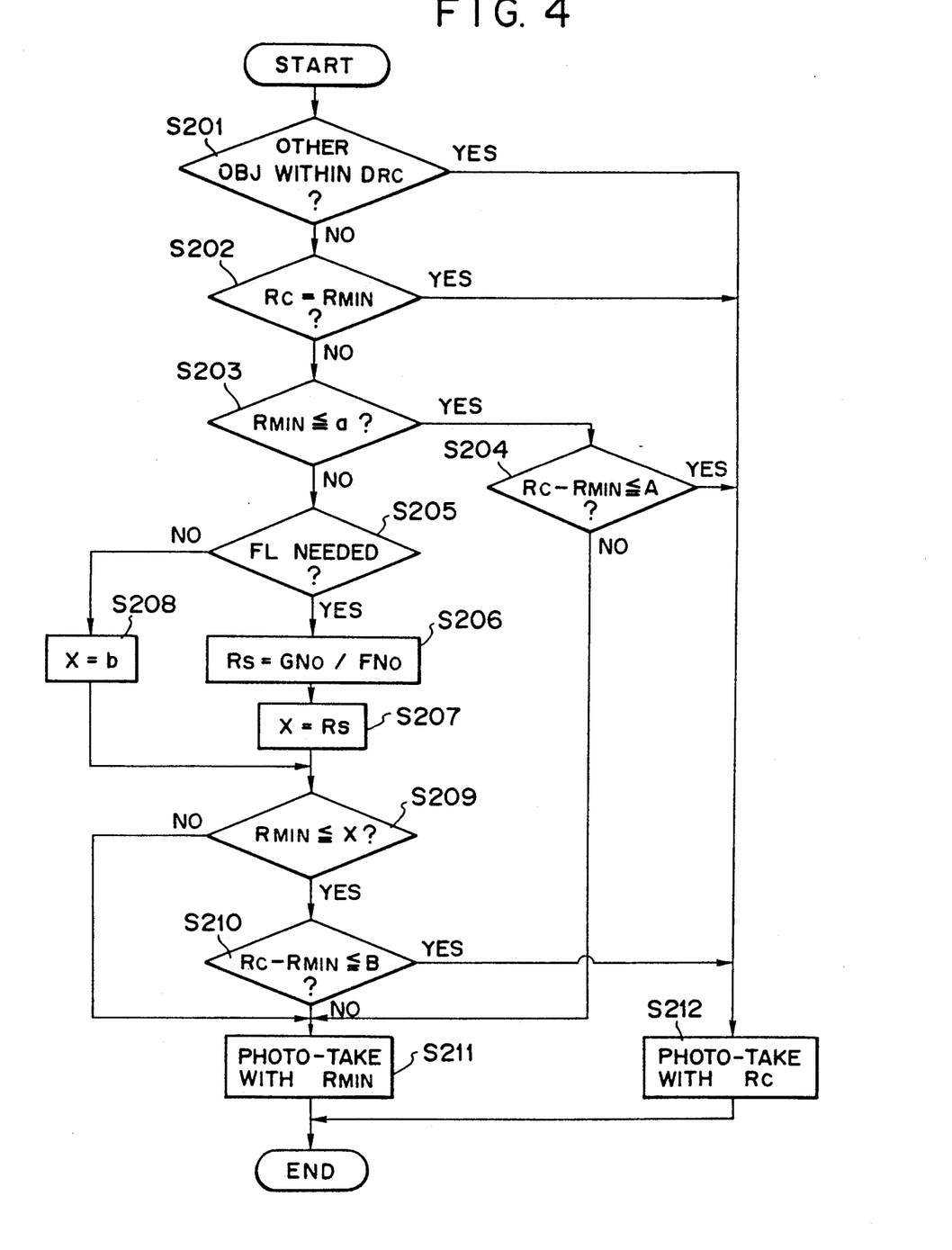
FIG. 4 shows a flow chart of an operation of a second embodiment of the multi-point distance measurement apparatus of the present invention.

FIG. 4 shows a flow chart of an operation of the second embodiment of the multi-point distance measurement apparatus of the present invention. The block diagram of FIG. 1 is also applicable to the second embodiment, so only the operation of the CPU will be explained.

In a step S201, whether objects at the object distances $R_L$ and $R_R$ are within the depth of field $D_{RC}$ for the object distance $R_C$ of the center point is determined. If objects at the object distances $R_L$ and $R_R$ are within the depth of field $D_{RC}$ for the object distance $R_C$ of the center point, the object distance $R_C$ of the center point is selected as the photographing distance (step S212), and otherwise the process proceeds to a step S202.

In a step S202, whether the object distance $R_C$ of the center point is equal to the object distance $R_{MIN}$ of the nearest object or not is determined, and if it is equal ($R_C = R_{MIN}$), the object distance $R_C$ of the center point is selected as the photographing distance (step S212), and otherwise the process proceeds to a step S203.

In the step S203, it is determined whether the lesser of the object distance $R_L$ of the left point and the object distance $R_R$ of the right point (that is, $R_{MIN}$) is equal to or smaller than a reference distance a (for example, 1.5 m) which is used to determined far distance photographing or near distance photographing. If, near distance photographing ($R_{MIN} \leq a$) is determined, the process proceeds to a step S204. If far distance photographing ($R_{MIN} > a$) is determined, the process proceeds to a step S205.

In the step S204, a difference $\Delta R$ ($= R_C - R_{MIN}$) between the object distance $R_C$ of the center point and the object distance $R_{MIN}$ of the nearest object is calculated and the difference $\Delta R$ is compared with a reference distance A (for example 50 cm). If the difference is equal to or smaller than the reference distance A ($\Delta R \leq A$), the object distance $R_C$ of the center point is selected as the photographing distance (step S212), and otherwise the object distance $R_{MIN}$ ($= R_L$ or $R_R$) of the nearest object is selected as the photographing distance (step S211).

In the step S205, whether the brilliance of the object is so dark that it needs the flash or not is determined, and if the flash is needed, the process proceeds to a step S206, and otherwise the process proceeds to a step S208.

In the step S206, a flash reach distance $R_S$ is calculated based on a ratio of a guide number (G No.) to an F number (F No.). In the step S207, a variable X is substituted by the flash reach distance $R_S$. Then, the process proceeds to a step S209.

In the step S208, the variable X is substituted by a reference b (for example 5 m) which is experimentally determined, and the process proceeds to step S209.

In step S209, whether the object distance $R_{MIN}$ ($= R_L$ or $R_R$) of the nearest object is equal to or smaller than the variable X or not is determined. If the object distance $R_{MIN}$ of the nearest object is equal to or smaller than the variable X ($R_{MIN} \leq X$), the process proceeds to a step S210, and if it is larger, the object distance $R_{MIN}$ of the nearest object is selected as the photographing distance (step S211).

In the step S210, a difference $\Delta R$ ($= R_C - R_{MIN}$) between the object distance $R_C$ of the center point and the object distance $R_{MIN}$ of the nearest object is calculated, and the difference $\Delta R$ is compared with a reference distance B (for example 1 m). When the difference $\Delta R$ between the object distances of the center point and the nearest object is equal to or smaller than the reference distance B ($\Delta R \leq B$), the object distance $R_C$ of the center point is selected as the photographing distance (step S212), and otherwise the object distance $R_{MIN}$ ($= R_L$ or $R_R$) of the nearest object is selected as the photographing distance (step S211).

In the second embodiment, the reference distances A and B which are compared with the difference between the distances of the objects are different for the near distance and the far distance because the relative distance is smaller and the depth of field is smaller in indoor photographing than in outdoor photographing for the same photographing scene.

In the far distance flash photographing, the photographing distance is determined by the same reference as that described above if the photographing distance is within the flash reach distance, but if the object to be focused is not within the flash reach distance, a priority is given to the exposure.

The present invention is not limited to the above embodiments, and other modifications may be made without departing from the scope of the present invention.

For example, while the reference distances A and B are selected for persons, larger distances may be selected for the photographing of a car race.

In accordance with one aspect of the present invention, when the photographing distance is to be determined by the distance information of the plurality of objects, a difference between the distances of the objects (the distances of the object at the center point on the image plane and the object at the right or left point) is compared with a reference distance and the distance to the center point or the nearest object is selected as the photographing distance based on the comparison result. Accordingly, when the same scene is photographed with different photographing distances, a given object can always be focused.

In accordance with another aspect of the present invention, since the different reference distances are used for far distance photographing and near distance photographing, photographing which is consistent with the actual scene is attained. That is, the object and background can be distinguished more precisely in each case.

In accordance with a further aspect of the present invention, a better exposure is assured when a nearest object is beyond the flash reach distance in the far distance flash photographing, in particular by selecting the distance to the nearest object as the photographing distance. If the distance to a farther object were selected in such a case, the focused object would be extremely underexposed and a photograph having a relatively bright and defocused near object could be produced. By selecting the nearest object distance as the photographing distance, a more natural photograph is obtained.

Incidentally, in the illustrative embodiments of the present application, a phototaking distance to an object positioned at a given point is measured by the distance measuring means, but the present invention may be applied to an apparatus for calculating a distance to an object on the basis of a defocus amount and information regarding the position of the lens.

What is claimed is:

1. A multi-point distance measurement apparatus comprising:
    distance measurement means for measuring distances to first and second points of an object field to produce distance information;
    difference determining means for determining a difference between the distances to the first point and the second point based on the distance information from said distance measurement means; and
    photographing distance selection means for comparing the difference with a predetermined value, selecting a smaller one of the distances to the first and second points as a photographing distance when the difference is larger than the predetermined value, and selecting the distance to the first point as the photographing distance when the difference is smaller than the predetermined value.

2. A multi-point distance measurement apparatus according to claim 1 wherein the first point corresponds to center of a photographed image plane.

3. A multi-point distance measurement apparatus according to claim 1 further comprising memory means for storing the distance information produced by said distance measurement means.

4. A multi-point distance measurement apparatus according to claim 1 wherein said predetermined value is 1 m.

5. A multi-point distance measurement apparatus comprising:
    distance measurement means for measuring distances to first and second points of an object field to produce distance information;
    distance mode determination means for determining whether a photographing mode is a far distance photographing mode in which a distance to the object is long or a near distance photographing mode in which is distance to the object is short, based on the distance information produced by said distance measurement means;
    difference determining means for determining a difference between the distances to the first and second points based on the distance information produced by said distance measurement means; and
    photographing distance selection means for selecting a photographing distance,
    said photographing distance selection means operating in a case when said distance mode determination means determines the near distance photographing mode for comparing said difference with a first predetermined value, selecting a smaller one of the distances to the first and second points as the photographing distance when said difference is larger than the first predetermined value, and selecting the distance to the first point as the photographing distance when said difference is smaller than the first predetermined value,
    said photographing distance selection means operating in a case when said distance mode determination means determines the far distance photographing mode for comparing said difference with a second predetermined value, selecting a smaller one of the distances to the first and second points as the photographing distance when said difference is larger than the second predetermined value, and selecting the distance to the first point as the photographing distance when said difference is smaller than the second predetermined value.

6. A multi-point distance measurement apparatus according to claim 5 wherein the first point corresponds to a center of a photographed image plane.

7. A multi-point distance measurement apparatus according to claim 5 further comprising memory means for storing the distance information produced by said distance measurement means.

8. A multi-point distance measurement apparatus according to claim 5 wherein the first predetermined value is smaller than the second predetermined value.

9. A multi-point distance measurement apparatus according to claim 5 wherein the first predetermined value is 50 cm and the second predetermined value is 1 m.

10. A multi-point distance measurement apparatus according to claim 5 wherein said determination means determines the far distance photographing mode when the distance to the nearer of the first point and the second point is larger than 1.5 m, and determines the near distance photographing mode when the distance to the nearer point is smaller than 1.5 m.

11. A multi-point distance measurement apparatus comprising:
    distance measurement means for measuring distances to first and second points of an object field to produce distance information;
    distance mode determination means for determining whether a photographing mode is a far distance photographing mode in which a distance to the object is long or a near distance photographing mode in which the distance to the object is short, based on the distance information produced by said distance measurement means;
    flash photographing mode determination means for determining a flash photographing mode or non-flash photographing mode;
    difference determining means for determining a difference between the distances to the first and second points based on the distance information produced by said distance measurement means;
    flash reach determining means for determining whether a nearer of the first and second points is within a flash reach distance when both the far distance and flash photographing modes are determined; and photographing distance selection means for selecting a photographing distance, said photographing distance selection means operating in a case when said distance mode determination means determines the near distance photographing mode for comparing said difference with a first predetermined value, selecting a smaller one of the distances to the first and second points as a photographing distance when said difference is larger than the first predetermined value, and selecting the distance to the first point as the photographing distance when said difference is smaller than the first predetermined value, said photographing distance selection means operating in a case when said distance mode determination means determines the far distance photographing mode and said flash photographing mode determination means determines the non-flash photographing mode for comparing said difference with a second predetermined value, selecting a smaller one of the distances to the first and second points as the photographing distance when said difference is larger than the second predetermined value, and selecting the distance to the first point as the photographing distance when said difference is smaller than the second predetermined value, said photographing distance selection means operating in a case when said distance mode determination means determines the far distance photographing mode, said flash photographing mode determination means determines the flash photographing mode, and said flash reach determining means determines that said nearer point is within the flash reach distance for comparing said difference with the second predetermined value, selecting the smaller one of the distances to the first and second points as the photographing distance when said difference is larger than the second predetermined value, and selecting the distance to the first point as the photographing distance when said difference is smaller than the second predetermined value, and said photographing distance selection means operating in a case when said distance mode determination means determines the far distance photographing mode, said flash photographing mode determination means determines the flash photographing mode, and said flash reach determining means determines that said nearer point is not within the flash reach distance for selecting the distance to said nearer point as the photographing distance.

12. A multi-point distance measurement apparatus according to claim 11 wherein the first point corresponds to a center of a photographed image plane.

13. A multi-point distance measurement apparatus according to claim 11 further comprising memory means for storing the distance information produced by said distance measurement means.

14. A multi-point distance measurement apparatus according to claim 11 wherein the first predetermined value is smaller than the second predetermined value.

15. A multi-point distance measurement apparatus according to claim 11 wherein the first predetermined value is 50 cm and the second predetermined value is 1 m.

16. A multi-point distance measurement apparatus according to claim 11 wherein said determination means determines the far distance photographing mode when the distance to said nearer point is larger than 1.5 m, and determines the near distance photographing mode when the distance to said nearer point is smaller than 1.5 m.

* * * * *